United States Patent
Ye

(10) Patent No.: US 6,760,911 B1
(45) Date of Patent: Jul. 6, 2004

(54) MESSAGING API FRAMEWORK

(75) Inventor: Yiqun Ye, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 520 days.

(21) Appl. No.: 09/676,384

(22) Filed: Sep. 29, 2000

(51) Int. Cl.[7] .............................................. G06F 9/46
(52) U.S. Cl. .................................................... 719/314
(58) Field of Search ........................................ 719/314

(56) References Cited

U.S. PATENT DOCUMENTS

| | | | |
|---|---|---|---|
| 6,012,081 A | 1/2000 | Dorn et al. ................. | 709/102 |
| 6,563,836 B1 * | 5/2003 | Capps et al. ................ | 370/412 |

OTHER PUBLICATIONS

Suhall M, Corba C++ Memory Management, 1999.*
Sun, Netsdynamics Pac for middleware, 1999.*

* cited by examiner

Primary Examiner—Meng-Al T. An
Assistant Examiner—LeChi Truong

(57) ABSTRACT

The Messaging API Framework is an MQ Series gateway allowing distributed C++ applications to communicate with little effort. The system is designed with an object-oriented paradigm in mind, and seamlessly integrates MQ Series' messaging technology. The application developers do not need to obtain any in-depth knowledge of MQ Series, rather, they can use it the same way they do any other C++ objects. More specifically, where MQ Series is to be used to allow communication between two end points, namely, a CORBA-based application in a CORBA environment, and a destination application, a layer of abstraction, or Application Programming Interfaces (APIs), built on top of MQ Series APIs is highly desirable to alleviate the burden of CORBA-based application programmers to handle the complexity of MQ Series programming. This layer could take the form of a framework. The Messaging API Framework of the present invention is intended to be such a layer. The framework is a self-contained module encapsulating the API's needed by the CORBA-based application to use MQ Series. The Messaging API Framework provides a number of APIs, allowing the programmers to place a request, to poll for a request, to send a reply, to receive a reply, and to send a request and block for a reply. Distributed applications can also use this system to communicate with the mainframe applications. In its most preferred embodiment the Messaging API Framework also assures any MQ Series problems are tracked in a self-contained module through circular logging.

4 Claims, 2 Drawing Sheets

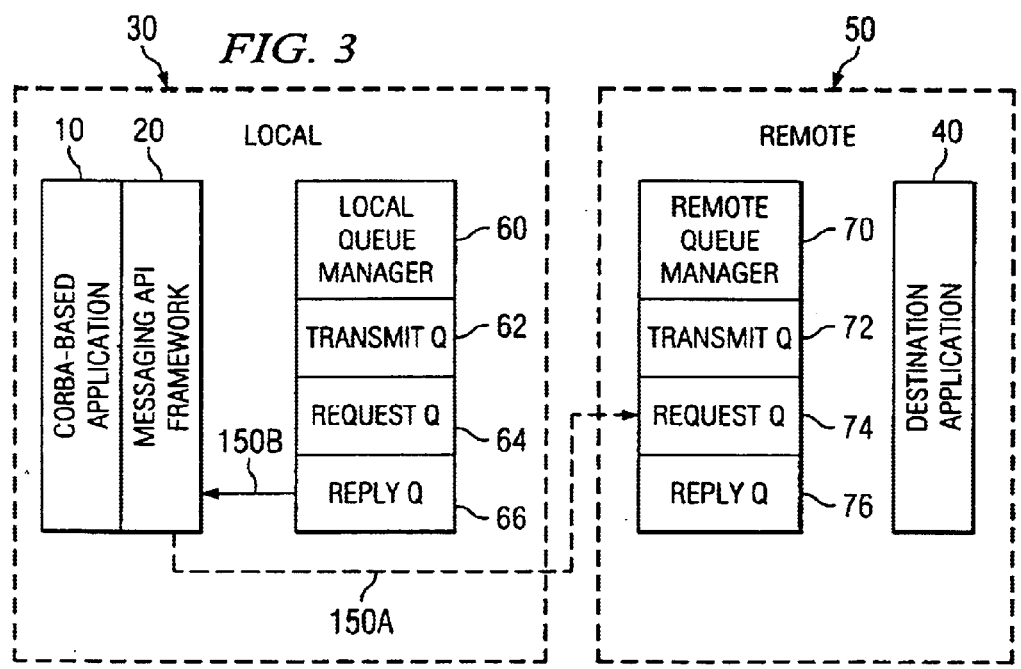

MESSAGING API FRAMEWORK

FILED OF THE INVENTION

The invention is a method and framework for improving and simplifying communication and command between an application and a messaging system.

BACKGROUND

MQ Series Messaging System is a message-oriented middleware for providing exchange of messages and data on an enterprise wide basis. The MQ Series Messaging System is described in more detail in the following reference publications, the entire contents which are incorporated herein by reference:

MQSeries for AIX V5.0 Quick Beginnings
(.software.ibm.com/ts/mqseries/library/manuals/amqaac/
    AMQAAC01.HTM)
MQSeries Application Programming Guide
(.software.ibm.com/ts/mqseries/library/manuals/csqzal/
    CSQZAL01.HTM)
MQSeries Application Programming Reference
(.software.ibm.com/ts/mqseries/library/manuals/csqzak/
    CSQZAK01.HTM)
MQSeries Using C++
software.ibm.com/ts/mqseries/library/manuals/amqzan/
    AMQZAN01.HTM)

Some current systems are making use of CORBA technology, as a choice of strategic middle-ware deployment, which is distinct from the messaging technology provided by MQ Series. CORBA is a type of a distributed object system that is defined under the Common Object Request Broker Architecture (CORBA) specification produced by OMG. A CORBA-based distributed object system is a system running in the context of an Object Request Broker (ORB) implemented under the CORBA specification from the OMG, Revision 2.0, Revision 2.1, Revision 2.2 and Revision 2.3, all of which are incorporated herein by reference in their entirety. For purposes of this application, programs compliant with CORBA Revision 2.3, 2.2, and 2.1, or later CORBA Revisions, by definition will be viewed as compliant with CORBA Revision 2.0. Unless otherwise specified, a generic reference to the CORBA Services specification will be presumed to be OMG's CORBA Services Revision 2.0. Similarly, a CORBA-based application is an application which is able to run in a manner compliant with the CORBA Services specification and able to operate and interact in a CORBA-based environment.

For a programmer working in a CORBA environment, the only ways to bridge to MQ Series messaging in a neighboring environment are for an application developer to gain in-depth knowledge of MQ Series, use its' complex API's, and apply those concepts in coding in each and every application. This knowledge must be gained system wide and employed by any programmers wishing to access the MQ Series messaging environment. This represents a substantial investment in knowledge not directly related to the primary CORBA environment in which such programmers are working and hence is a relatively inefficient use of resources.

SUMMARY OF INVENTION

The present invention provides a method for communicating messages between a CORBA-based application on a local system and a remote destination application on a remote system using a CORBA-based Messaging API framework in combination with an MQ Series Messaging system.

In this method, the CORBA-based application uses C++ code to communicate at least one of a group of commands selected from poll request, receive reply, send reply, send request, and send request and block for reply to the CORBA-based Messaging API framework on the local system. The Messaging API framework encapsulates a set of application programming interfaces for interfacing with an MQ Series Messaging system, wherein the set of application programming interfaces comprises a poll request API, a receive reply API, a send reply API, a send request API, and a send request and block for reply API.

The Messaging API framework uses MQ Series compliant language to communicate the selected command to a Local Queue Manager on the local system. The Local Queue Manager manages a set of queues, wherein the set of queues comprises a local request queue, a local reply queue, a local dead-letter queue, and a local transmission queue and wherein the Local Queue Manager uses the local transmission queue to provide a local address for communicating with a remote request queue and a remote reply queue;

The Local Queue Manager interprets the selected command and modifies at least one of the set of queues managed by the Local Queue Manager in response to the selected command. The Local Queue Manager communicates with a Remote Queue Manager on the remote system using the local transmission queue to update at least one of a group of queues selected from the local request queue, the local reply queue, the remote request queue and the remote reply queue.

Like the Local Queue Manager, the Remote Queue Manager manages a set of queues, wherein the set of queues comprises the remote request queue, the remote reply queue, a remote dead-letter queue, and a remote transmission queue and wherein the Remote Queue Manager uses the remote transmission queue to provide a remote address for communicating with the local request queue and the local reply queue.

The Remote Queue Manager communicates information regarding the updated queue to the remote destination application on the remote system in response to at least one command originating from the remote destination application.

Alternatively, the present invention provides a CORBA-based Messaging API framework for communicating between a CORBA-based application and an MQ Series Messaging System. The framework includes a set of application programming interfaces for interfacing with an MQ Series Messaging system encapsulated by the Messaging API framework, wherein the set of application programming interfaces includes a poll request API, a receive reply API, a send reply API, a send request API, and a send request and block for reply API. The Messaging API framework receives commands communicated by the CORBA-based application, using C++ code selected from the group of commands which comprises poll request, receive reply,, send reply, send request, and send request and block for reply. The Messaging API framework uses MQ Series compliant language to communicate such commands to the MQ Series Messaging System. The Messaging API framework uses MQ Series compliant language to receive responses to such commands from the MQ Series Messaging System. The Messaging API framework communicates the responses to the CORBA-based application.

DESCRIPTION OF THE DRAWINGS

FIG. 3 is a diagrammatic representation of the system architecture illustrating the primary pathways of the most common compound command.

DETAILED DESCRIPTION

Where MQ Series is to be used to allow communication between two end points, namely, a CORBA-based application in a CORBA environment, and a destination application, a layer of abstraction, or Application Programming Interfaces (APIs), built on top of MQ Series APIs is highly desirable to alleviate the burden of CORBA-based application programmers to handle the complexity of MQ Series programming. This layer could take the form of a framework. The Messaging API Framework of the present invention is intended to be such a layer; it encapsulates the APIs needed by the CORBA-based application to use MQ Series. The tradeoff for simplicity is less genericity and less versatility. The Messaging API Framework provides a number of APIs, allowing the programmers to place a request, to poll for a request, to send a reply, to receive a reply, and to send a request and block for a reply. To minimize the complexity of these APIs, certain assumptions are made, as will be described in the following sections.

The primary area of use of the Messaging API Framework is for distributed C++ applications using MQ Series messaging technology to communicate with each other, without requiring application developers' to learn MQ Series. Distributed applications can also use this system to communicate with the mainframe applications. In its most preferred embodiment the Messaging API Framework also assures any MQ Series problems are tracked in a self-contained module.

The Messaging API Framework was developed and tested on AIX and Windows NT 4.0 workstation platforms. In its most preferred embodiment it calls for IBM RS6000, with AIX 4.1.4 (or above), IBM MQseries 5.0 and latest patches, and TCP/IP connectivity; or alternatively for any Intel 486 (or above) processor-based IBM PC or compatible, with Windows NT 4.0 (or above), IBM MQSeries 5.0, and any communications hardware supporting TCP/IP.

System

Figure 1:
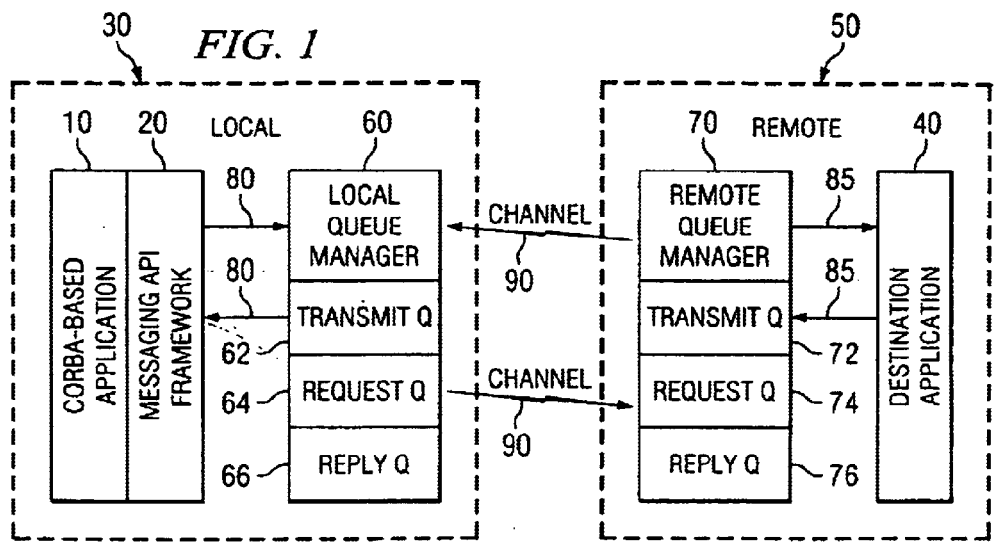
FIG. 1 is a diagrammatic representation of the system architecture of the preferred embodiment.

FIG. 1 depicts the topology of the system implemented. At one end point is the CORBA-based application 10 and the Messaging API Framework of the present invention 20. For the purposes of this disclosure the CORBA environment in which these reside is defined as the Local environment 30. The destination application 40 with which message exchange is desired resides in the Remote environment 50. The CORBA-based application 10 in the local environment 30 and the destination application 40 in the remote environment 50 represent the end points of the proposed system.

MQ Series servers are installed on both end points. Each has one queue manager active, the Local Queue Manager 60 in the local environment 30 and the Remote Queue Manager 70 in the remote environment 50. The two queue managers 60 & 70 communicate with each other in both directions, over configured MQ channels 90. The Messaging API Framework 20 acts as the interface between the CORBA-based application 10 and the MQ Series Messaging System represented by its two illustrated queue managers 60 & 70.

The queue manager that an application directly connects to is referred to as the local queue manager; while the other queue manager is the remote queue manager. Queues owned by the local queue manager are local queues while those owned by the remote queue manager are remote queues. Unless otherwise noted, for purposes of this disclosure, the point of view taken will be defined as that of the CORBA-based application 10. Hence its environment 30 will be described as the "local" environment and its queue manager 60 will be described as the "local" queue manager.

In addition to MQ Series system default objects, both the local and the remote environment 30 & 50 should be configured to contain at least the following: a transmission queue 62 & 72 (respectively), a dead-letter queue (not illustrated), a request queue 64 & 74 (respectively), and a reply queue 66 & 76 (respectively). Summary of an example MQ Series configuration is included below.

An application always sends a request to the remote request queue, and a reply to the remote reply queue, using local definitions of the remote queues, as will be described later. An application receives a request from its local request queue, and gets a reply from the: local reply queue. An application can also make a request to the remote request queue and block itself waiting on its local reply queue for a reply. As a result, CORBA-based application 10, through Messaging API Framework 20 communicates back and forth with the MQ Series Messaging System through communication links 80 to Local Queue Manager 60. Destination application 40 communicates back and forth with the MQ Series Messaging System through communication links 85 to Remote Queue Manager 70.

The Messaging. API Framework 20 is able to receive one of a group of commands communicated by the CORBA-based application 10 using C++ code and then use MQ Series compliant language to communicate the selected command to a Local Queue Manager 60 in the local environment 30. In this manner, the Messaging API Framework reduces the burden on application programmers drafting CORBA-complaint code in C++ from having to incorporate extensive code compliant with MQ Series commands and API's in order to access an MQ Series Messaging System. The Messaging API Framework abstracts this task and handles the mapping of more generic requests in C++ to appropriate MQ Series compliant language for transmission to the MQ Series Messaging System.

Message Flow

Figure 2:
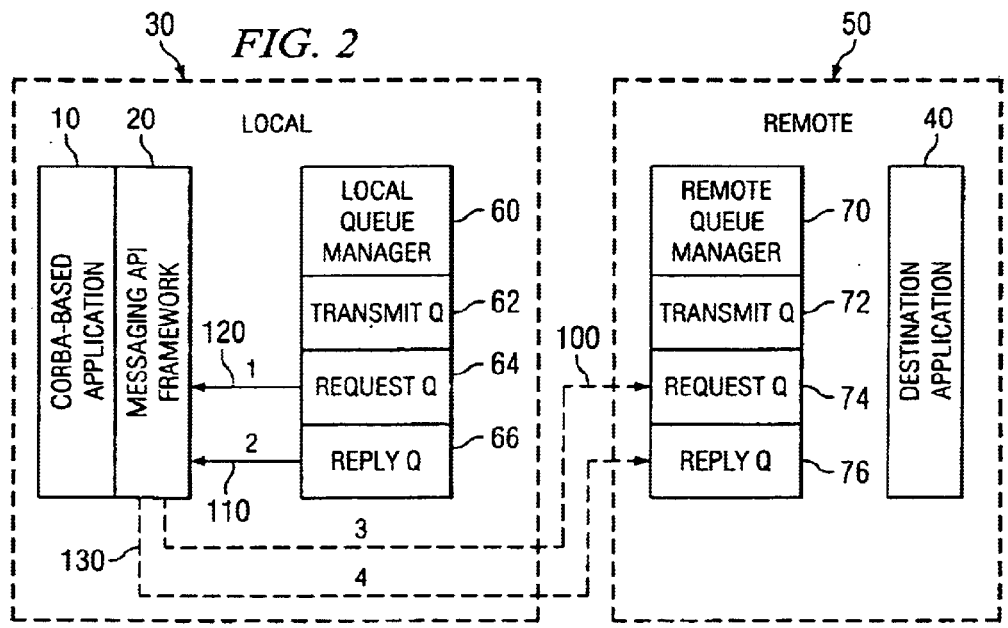
FIG. 2 is a diagrammatic representation of the system architecture illustrating primary pathways of the four fundamental implemented commands.

Based on the above system described incorporating Messaging API Framework 20, the preferred message flow of the various message commands can be depicted in FIG. 2 and FIG. 3.

In FIG. 2 the four basic or fundamental operations are depicted. Send Request 100 (also referred to as putRequest) sends a request for information from CORBA-based application 10 through Messaging API Framework 20 to eventually arrive in Remote Request Queue 74 where it awaits receipt by destination application 40. Receive Reply 110 (also referred to as getReply) checks Local Reply Queue 66 for a reply to an earlier sent request. In addition, operations 100 and 130 in FIG. 2 preferably also check for a "Confirm-On-Arrival" acknowledgement (COA), and may also check for a Confirmation of Delivery acknowledgement (COD) which are not shown in the Figures. These responses, generated by the queue manager receiving and delivering requests or replies to its queues, would arrive back in the reply queue local to the sending application. In this instance, they would be sent by Remote Queue Manager 70 to arrive in Local Reply Queue 66.

The remaining two fundamental operations allow CORBA-based Application 10 to be responsive to actions from destination application 40. Poll Request 120 checks Local Request Queue 64 for incoming requests sent by destination application 40. The check occurs on command by CORBA-based application 10 communicated through Messaging API Framework 20 to Local Queue Manager 60 to investigate and obtain messages from Local Request Queue 64. In a programming sense, Messaging API Framework 20 connects with Local Queue Manager 60 and using the handle provided by that connection to view and access the queues managed by Local Queue Manager. For the purposes of this disclosure, where access is had and modifications are made to queues through the queue manager, the queue manager will have been said to have taken such actions on behalf of the requesting framework or application. Send Reply 130 (also referred to as putReply) places a message (typically responsive to a request made by destination application 40) into Remote Reply Queue 76 from CORBA-based Application 10 by way of Messaging API Framework 20, Local Queue Manager 60, and Remote Queue Manager 70.

The send request and block for reply operation (also referred to as PutandGet) depicted in FIG. 3 with operation 150A sending the request and operation 150B blocking for the reply is in fact the combination of operations 100 and 110 in FIG. 2. While the other operations may be asynchronous, the particular compound operation depicted in FIG. 3 is typically (although not necessarily) used when a synchronous response is desired by the originating application. In this case, the application sends the request and blocks itself awaiting a reply to its request. This represents a traditional single-threaded behavior, as compared with asynchronous behavior using multiple threads where the application is not tied up awaiting a particular response.

In FIGS. 2 & 3, send request 100 or send reply 130 or 150A (respectively) from Messaging API Framework 20 to remote request queue 74 and remote reply queue 76 are represented by dashed lines, because Messaging API Framework 20 does not directly connect to the Remote Queue Manager 70. Messages being sent to the remote queues are actually sent to the local definition of corresponding remote queues; and the queue managers collaborate to handle the delivery of the message. In practice, this means that Messaging API Framework 20 sends a remote request or reply to the local address for the remote request of reply queue. The local address is maintained by Local Queue Manager 60 which then directs the request to its local transmission queue 62. The Local and Remote Queue Managers 60 & 70 cooperate to transmit the request from the local transmission queue 62 to Remote Queue Manager 70 which files the request in the appropriate remote queue 74 or 76. When the destination application 40 is attempting to send a request or reply, the same process occurs from the other direction. The request or reply is directed to an address local to the remote system in care of Remote Queue Manager 70. It is placed in remote transmission queue 72 and the queue managers 60 & 70 cooperate to transmit the request to Local Queue Manger 60 which files the request either in Local Request Queue 64 or Local Reply Queue 66 as appropriate.

Methodology

The emphasis of the Messaging API Framework is its simplicity while allowing certain flexibility. As an example, a detailed description of an exemplary set of configurations and programs is provided for a Messaging API Framework which is identified by the shorthand of VCSMQ. Applications using Messaging API Framework should concentrate on the usage of the data type VcsMq, where all messaging interfaces are defined. Other data types, including VcsMq-Config to store configuration information, VcsMqException to define Messaging API Framework related exceptions, and VCSMQID to store MQ Series message ID and correlation ID, are also provided to assist in achieving the stated goals.

As mentioned previously, a configuration file is used by the application using Messaging API Framework. Simplicity and flexibility of Messaging API Framework are compromised by using this configuration file: only those parameters that are essential to define two communicating queue managers appear in the file. The configuration file, together with the MQ Series configuration file, reflects the assumptions made to use Messaging API Framework. In particular, an application using Messaging API Framework connects to the local, and not to the remote, queue manager. Communication between the two queue managers is defined by the MQ Series configuration file. Using this approach, the local definitions of the remote request queue and the remote reply queue are necessary.

Information in the Messaging API Framework configuration file is stored in the object of class VcsMqConfig, and can be passed to construct objects of class VcsMq.

A C++ program can read the configuration file at appropriate time, either before or after the instantiation of VcsMq objects. Although MQ Series method invocations are not thread-safe, Messaging API Framework is written in such a way that all its invocations are thread-safe. Therefore, for efficiency reasons, the configuration file should be read and VcsMq objects instantiated in the process level (rather than thread level) whenever possible.

A sample configuration file reads as follows:

I. Sample Configuration File

```
##########################################
# Queue managers
# Alert: DO NOT USE REMOTE QUEUE MANAGER
# RMT_Q_MGR =
##########################################
LCL_Q_MGR = DAY2KTO2
##########################################
# Local queues

# local request queue LCL_REQUEST_Q
# local reply queue LCL_REPLY_Q
##########################################
LCL_REQUEST_Q     = DAY2KTO2.R
LCL_REPLY_Q       = DAY2KTO2.X
##########################################
# RMT_REQUEST_Q is the local definition of the remote
# request queue

# RMT_REPLY_Q is the local definition of the remote
# reply queue
##########################################
RMT_REQUEST_Q     = REMOTE.R
RMT_REPLY_Q       = REMOTE.X
##########################################
# Log file name
##########################################
LOG_FILE_NAME     = VcsMq.log
##########################################
# Timeout
# When placing MQ calls, specify here how long in
# seconds to wait
##########################################
GET_WAIT_SECS     = 10
```

After reading the configuration file and construction of VcsMq objects, the application needs only allocating message buffers, providing the length of the buffers, and may also declare variables of VCSMQID which is a class to store MQ Series' message ID and correlation ID. Upon completing these steps, invoking VcsMq methods is straightforward, as will be illustrated in the sample programs below.

Application Programming Interfaces (APIs)

The primary programming interfaces are encapsulated by the class VcsMq. The following elaborates each of the methods. All other interfaces related to Messaging API Framework are group into "others" section. A summary of these exemplary API's is provided as follows.

All messaging interfaces may throw VcsMqException exceptions; error messages are also written to a log file with time stamp (The log file name is specified in the configuration file). When the size of the log file grows to reach a certain limit (MAX_LOG_SIZE), all its information is stored in a backup file with the same name appended with ".backup", and the log file itself is truncated to zero length, and starts anew.

readConfigFile

Signature: void readConfigFile( )

It takes no parameter, and does not return a value.

This method reads the Messaging API Framework configuration file. It actually delegates the task to VcsMqConfig objects.

This is an alternative way to obtain information in the configuration file. Another approach is to construct the VcsMqConfig first, then read the configuration file (discussed below), and finally construct the VcsMq objects.

This method catches and throws VcsMqException related to file and file I/O errors, thrown by objects of VcsMqConfig.

pollRequest

Signature: long pollRequest(unsigned char* outBuffer, long outLength, VCSMQIDI* id)

Where:

outBuffer—points to the buffer allocated by the user to receive the request message;

outLength is the length of outBuffer;

id points to the user allocated space to store VCSMQID of the request message received.

The actual length of the request message is returned as the return value. All three parameters are required.

This method tries to retrieve a request message from the local request queue, and may throw VcsMqException exceptions. The exception may be caused by MQ Series "No Message Available" condition, which may not be fatal depending on the program logic. A C++ program may catch such an exception, ignore it, and continue to poll for requests.

getReply

Signature: long getReply(unsigned char* outBuffer, long outLength, VCSMQIDI* id)

Where:

outBuffer points to the buffer allocated by the user to receive the request message;

outLength is the length of outBuffer;

id points to a variable of VCSMQID where a reply that matches the id will be received.

The actual length of the request message is returned as the return value. All three parameters are required.

This method tries to receive a reply message from the local reply queue, and may throw VcsMqException exceptions. The id must be specified by the application before invoking this method. Only the reply message whose message ID and correlation ID match those contained in the id can be successfully received. This id can be obtained by a previous putRequest( ) call, as discussed below.

putRequest

Signature: VCSMQID putRequest(unsigned char* inbuffer, long inLength)

Where:

inBuffer points to the request message buffer prepared by the application;

inLength is the length of the inBuffer;

This method, upon successful sending the request, will return both the message ID and the correlation ID, packaged into VCSMQID. Both parameters are required.

This method tries to place a request message into the local definition of the remote request queue, and have the queue managers collaborate to deliver the request message to the remote request queue. This method, after putting the request, also wait on the local reply queue for a COA., which is reported by the remote queue manager when the original request succefully arrives at the remote request queue. The returned VCSMQID may be saved by the caller if it chooses to receive a reply corresponding the original request at a later time.

VcsMqException exceptions may be thrown by this method.

putReply

Signature: void putReply(unsigned char* inBuffer, long inLength, VCSMQID* id)

Where:

inBuffer points to the reply message buffer prepared by the application;

inLength is the length of the inBuffer;

id points to a variable of VCSMQID containing the message ID and the correlation ID.

This method does not return a value. All parameters are required.

This method tries to send a reply message to the remote reply queue in response to a request with the same VCSMQID id. Like putRequest, this method also checks for COA.

VcsMqException exceptions may be thrown by this method.

putAndGet

Signature: long putAndGet(unsigned char* inBuffer, long inLength, unsigned char* outBuffer, long outLength)

Where:

inBuffer points to a request message buffer prepared by the application;

inLength is the length of the inBuffer;

outBuffer points to a buffer to receive the reply message;

outLength is the length of the outBuffer.

This method returns the actual length of the message successfully received. All parameters are required.

This method tries to send a request message to the local definition of the remote request queue and wait on the local reply queue for a reply. It combines all the operations of putRequest and getReply methods. It re-throws any exception caught.

Version

Signature: char* version( )

This method does not take any parameter, and returns the current version of Messaging API Framework as a null-terminated character string.

Others

The class VcsMqException is used to construct any Messaging API Framework related exceptions. It contains an error code and a text string to explain the error condition. Two methods are available to return the two respective values.

The class VcsMqConfig is used to read the configuration file and to store the relevant information. Interfaces are available to retrieve the attributes, and a read method is provided to read the configuration file. This read method may throw file and file I/O related VcsMqException exceptions.

Example Programs/Routines

Four exemplary programs representing each of the fundamental commands are provided: HelloGet (corresponding to Poll Request), HelloPutMT (corresponding to Send Request), HelloReply (corresponding to Send Reply), and HelloWaitReplyMT (corresponding to Receive Reply).

HelloGet is a single threaded program that waits on the local request queue. It prints out the message received. It reports an exception caught; except for "No Message : Available" condition, the program exits.

HelloGet Example Code

```
//////////////////////////////////////////////////////////////////////
//
// File HelloPut.cpp
//
// Use only one thread
//
//////////////////////////////////////////////////////////////////////
#include <string.h>
#include <iostresm.h>
#include "VcsMq.hpp"
#include "VcsMqException.hpp"
int usage(char* prog) ;
int main(int argc, char** argv)
{
    if (srgc != 2) return usage(argv[0]) ;
    try
    {
        VcsMq listener(argv[1]) ;
        listener.readConfigFile( ) ;
        while (TRUE)
        {
            VCSMQID id;
            long len;
            char buffer[256] ;
            memset(buffer, '\0', sizeof(buffer) ) ;
            try
            {
                len = listener.pollRequest((unsigned char*)
                        &buffer[0], sizeof(buffer), &id ) ;
            }
            catch (VcsMqException &e)
            {
                if (e.code( ) == VCSMQERR_NO_MSG) continue;
                else
                {
                    throw;
                }
            }
            if (buffer[0] != '\0')
            {
                buffer[len] = '\0' ;
                cout << "Got:" << buffer << endl << endl;
            }
        }
    }
    catch (VcsMqException &e)
    {
        e.print( ) ;
    }
    catch( . . . )
    {
        cout << "Some exception caught" << endl;
    }
    return 0;
}
int usage(char* prog)
{
    cout << "Usage:" << endl;
    cout << "   " << prog << " <Config file>" << endl << endl;
    return 1;
}
```

HelloPutMT is a multithreaded program that puts a message to the remote request queue, waits on the local reply queue for a COA, and exits. The thread exits when an exception is caught.

HelloPutMT Example Code

```
//////////////////////////////////////////////////////////////////////
//
// File HelloPutMT.cpp
//
// Use multiple threads
//
//////////////////////////////////////////////////////////////////////
#include <string.h>
#include <iostream.h>
#include <stdio.h>
#include "VcsMq.hpp"
#include "VcsMqException.hpp"
#if defined (NT)
#include <windows.h>
#include <process.h>
#elif defined (AIX)
#include <pthread.h>
#include <unistd.h>
#endif
typedef struct
{
    int id;
} ThreadArgs;
VcsMqConfig configData;
const static int NUMTHREADS = 5;
#if defined (NT)
HANDLE hArray [NUMTHREADS] ;
#define THREADTYPE void
#elif defined (AIX)
int trvalue [NUMTHREADS] ;
#define THREADTYPE void *
#endif
int usage(char* prog) ;
THREADTYPE worker(void* args);
int main(int argc, char** argv)
{
    int i;
    ThreadArgs threadArgs [NUMTHREADS] ;
#if defined (AIX)
    int j;
    int *val[NUMTHREADS] ;
    pthread_t tid[NUMTHREADS] ;
#endif
    if (argc != 2) return usage(argv[0] ) ;
    for (i=0; i<NUMTHREADS; i++)
    {
#if defined (NT)
        hArray[i] = CreateEvent (NULL, FALSE,FALSE,NULL) ;
#elif defined (AIX)
        val[i] = new int;
#endif
    }
    configData.fileName(argv[1] ) ;
    configData.read( ) ;
    for (i=0; i<NUMTHREADS; i++)
    {
        threadArgs[i].id = i;
#if defined (NT)
        unsigned long hTemp = beginthread(worker, 0,
            (void*)&(threadArgs[i]) ) ;
        if ( (long)hTemp == (long)-1 )
        {
            cout << "_beginthread failed." << endl;
        }
        else
        {
            cout << "_beginthread returned handle " <<
            hTemp << endl;
        }
```

-continued

```
#elif defined (AIX)
        if (pthread_create(&tid[i] , NULL, worker,
            (void*)&(threadArgs[i]) ) )
        {
            cout << "Thread creation was not successful." << endl;
        }
        else
        {
            cout << "Thread " << tid[i] << "created." << endl;
        }
#endif
    }
#if defined (NT)
    WaitForMultipleObjects(NUMTHREADS, hArray, TRUE,
        INFINITE) ;
#elif defined (AIX)
    for (j=0; j<NUMTHREADS; j++)
    {
        int err = pthread_join( tid[j], (void**) &val[j] ) ;
        cout << "pthread_join returned " << err << endl;
    }
    for (j=0; j<NUMTHREADS; j++)
    {
        delete val[j] ;
    }
#endif
    return 0;
}
THREADTYPE worker(void* args)
{
    ThreadArgs *myid = (ThreadArgs*) args;
    try
    {
        // Because all VcsMq calls are thread safe,
        // we may as well declare the sender in the
        // main program and pass it here through
        // ThreadArgs, or, alternatively, declare
        // it as global in this sample
        //
        // Here only shows this approach is OK
        // but may not be as efficient as that
        // demonstrated in the sample program
        // HelloWaitReplyMT
        VcsMq sender(configData) ;
        VCSMQID VcsMqId;
        char buffer[256] ;
        sprintf(buffer, "Hello from thread %d", myid->id) ;
        for (int i = 0; i < 10; i++ )
        {
            sender.putRequest( (unsigned char*) &buffer[0],
                strlen(buffer) ) ;
        }
    }
    catch (VcsMqException &e)
        e.print( ) ;
    }
    catch( . . . )
    {
        cout << "Some exception caught" << endl;
    }
#if defined (NT)
    SetEvent( hArray[myid->id] ) ;
    _endthread( ) ;
#elif defined (AIX)
    // This value not used in this example, so set to 0
    trValue[myid->id] = 0;
    pthread_exit (&trValue[myid->i] ) ;
    return 0;
#endif
}
int usage(char* prog)
{
    cout << "Usage:" << endl;
    cout << "   " << prog << " <config file>" endl << endl;
    return 1;
}
```

HelloReply is a single threaded program that polls requests on the local request queue. Once a request is received, it forms a reply and sends the reply back to the remote reply queue, and then waits on its local reply queue for a COA. The program exits when catching an exception other than "No Message Available".

HelloReply Example Code

```
///////////////////////////////////////////////////////////////////
//
// File HelloReply.cpp
//
// Use only one thread
//
///////////////////////////////////////////////////////////////////
#include <stcing.h>
#include <iostream.h>
#include <ctype.h>
#include "VcsMq.hpp"
#include "VcsMqErr.hpp"
#include "VcsMqException.hpp"
int usage (char* prog) ;
int main(int argc, char** argv)
{
    long i;
    if (argc != 2) return usage(argv[0] ) ;
    try
    {
        VcsMq listener(argv[1] ) ;
        listener.readconfigFile( ) ;
        while (TRUE)
        {
            VCSMQID id;
            long len;
            char buffer[256] ;
            memset(buffer, '\0', sizeof(buffer) ) ;
            // do not exit when "No Message" is received and timed out
            try
            {
                len = listener.pollRequest((unsigned char*)
                    &buffer[0] , sizeof(buffer), &id) ;
            }
            catch (VcsMqException &e)
            {
                e.print( ) ;
                if ( e.code( ) == VCSMQERR_NO_MSG)
                {
                    cout << "\"No Message (" <<
                        VCSMQERR_NO_MSG
                        << ")\" is not fatal. "
                        << "Continue to poll request . . ." <<
                        endl << endl;
                    continue;
                }
                else throw;
            }
            catch( . . . )
            {
                throw;
            }
            buffer[len] = '\0';
            if (buffer[0] != '\0')
            {
                cout << "Got:" << buffer << endl << endl;
            }
            // put it back
            for (i=0; i<len; i++)
            {
                if (islower(buffer[i]))
                    buffer[i] = toupper(buffer[i] ) ;
                else if (isupper(buffer[i] ) )
                    buffer[i] = tolower(buffer[i] ) ;
            }
            listener.putReply( (unsigned char*) &buffer[0] ,
                strlen(buffer) , &id) ;
        }
    }
}
```

-continued

```
    catch(VcsMqException &e)
    {
        e.print( )
    }
    catch( . . . )
    {
        cout << "Some exception caught" << endl;
    }
    return 0;
}
int usage(char* prog)
{
    cout << "Usage:" << endl;
    cout << "    " << prog << " <Config file>" << endl << endl ;
    return 1;
}
```

HelloWaitReply is a multithreaded program that sends a request message to the remote request queue, waits on its local reply queue for a COA, and a reply. Threads exit when catching exceptions.

HelloWaitReplyMT Example Code

```
////////////////////////////////////////////////////////////////
//
// File HelloWaitReplyMT.cpp
//
// Use multiple threads
//
////////////////////////////////////////////////////////////////
#include <string.h>
#include <iostream.h>
#include <stdio.h>
#include "VcsMq.hpp"
#include "VcsMqException.hpp"
#if defined (NT)
#include <windows.h>
#include <process.h>
#elif defined (AIX)
#include <pthread.h>
#include <unistd.h>
#endif
typedef struct
{
    int id;
    VcsMq* obj;
} ThreadArgs;
VcsMqConfig configData;
const static int NUMTHREADS = 5;
#if defined (NT)
HANDLE hArray [NUMTHREADS] ;
#define THREADTYPE void
#elif defined (AIX)
int trValue [NUMTHREADS] ;
#define THREADTYPE void *
#endif
int usage(char* prog) ;
THREADTYPE worker(void* args) ;
// Note:
// Outputs to screen are not protected by mutex
// so outputs from different threads may interfere
// with each other. That is find for this sample
int main(int argc, char** argv)
{
    int i;
    ThreadArgs threadArgs [NUMTHREADS] ;
#if defined (AIX)
    int j;
    int *val [NUMTHREADS] ;
    pthread_t tid[NUMTHREADS] ;
#endif
    if (argc != 2) return usage(argv[0] ) ;
    for (i=0; i<NUMTMREADS; i++)
    {
#if defined (NT)
        hArray[i] = CreateEvent (NULL, FALSE, FALSE, NULL) ;
#elif defined (AIX)
        val[i] = new int;
#endif
    }
    configData.fileName(argv[1] ) ;
    configData.read( ) ;
    // Because all methods of VcsMq are thread-safe,
    // we are using the same VcsMq object for all
    // threads. This approach is different from
    // the sample program HelloPutMT
    VcsMq sender(configData) ;
    for (i=0; i<NUMTHREADS; i++)
    {
        threadArgs[i].id = i;
        threadArgs[i] .obj = &sender;
#if defined (NT)
        unsigned long hTemp = _beginthread(worker, 0,
            (void*)&(threadArgs[i] ) ) ;
        if ( (long)hTemp == (long)-1 )
        {
            cout << "_beginthread failed." << endl;
        }
        else
        {
            cout << "_beginthread returned handle " << hTemp <<
                endl;
        }
#elif defined (AIX)
        if (pthread_create(&tid[i], NULL, worker,
            (void*)&(threadArgs[i] ) ) )
        {
            cout << "Thread creation was not successful." << endl;
        }
        else
        {
            cout << "Thread " << tid[i] << " created." << endl;
        }
#endif
    }
#if defined (NT)
    WaitForMultipleObjects(NUMTHREADS, hArray, TRUE,
        INFINITE) ;
#elif defined (AIX)
    for (j=0; j<NUMTHREADS; j++)
    {
        int err = pthread_join( tid[j], (void**) &val[j] ) ;
        cout << "pthread_join returned " << err << endl;
    }
    for (j=0; j<NUMTHREADS; j++)
    {
        delete val[j] ;
    }
#endif
    return 0;
}
THREADTYPE worker(void* args)
{
    ThreadArgs *myid = (ThreadArgs*) args;
    VcsMq* sender = myid->obj;
    long len;
    try
    {
        char buffer[256] ;
        char buffer2[256] ;
        sprintf(buffer, "Hello from thread %d", myid->id) ;
        for (int i = 0; i < 10; i++ )
        {
            len = sender->putAndGet( (unsigned char*) &buffer[0],
                strlen(buffer), (unsigned char*) &buffer2[0],
                sizeof(buffer2) ) ;
#ifdef _DEBUG
            buffer2[len] = '\0' ;
            cout << "Got Reply: " << buffer2 << endl;
#endif
        }
    }
```

-continued

```
    catch(VcsMqException &e)
    {
        e.print( ) ;
    }
    catch( . . . )
    {
        cout << "Some exception caught" << endl;
    }
#if defined (NT)
    SetEvent ( hArray[myid->id] ) ;
    _endthread( ) ;
#elif defined (AIX)
    // This value not used in this example, so set to 0
    trValue[myid->id] = 0;
    pthread_exit (&trValue[myid->id] ) ;
    return 0;
#endif
}
int usage(char* prog)
{
    cout << "Usage:" << endl;
    cout << "    " << prog << " <Config file>" << endl << endl;
    return 1;
}
```

Multiple processes of these programs can be run simultaneously. To run the programs, make sure the MQ channels are up and running, then enter the program name followed by the configuration file name.

HelloGet and HelloPutMT work together; HelloReply and HelloWaitReplyMT work together.

Example: If the HelloGet is to use get cfg as the configuration file and HelloPutMT is to use put cfg as the configuration file, then in one console, go to the directory containing the program and issue:

./HelloGet get cfg

In another console, go to the same directory as above and type:

./HelloPutMT put cfg

In summary, the Messaging API Framework is an MQ Series gateway allowing distributed C++ applications to communicate with little effort. The system is designed with an object-oriented paradigm in mind, and seamlessly integrates MQ Series' messaging technology. The framework is a self-contained module encapsulating well-defined interfaces and exceptions. The framework maintains flexibility by providing simple and flexible MQ Series initialization and by maintaining circular logging for easy problem determination in its most preferred embodiment. The application developers do not need to obtain any in-depth knowledge of MQ Series, rather, they can use it the same way they do any other C++ objects.

Although only a few embodiments of the present invention have been described, it should be understood that the present invention may be embodied in many other specific forms without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A method for communicating messages between a CORBA-based application on a local system and a remote destination application on a remote system using a CORBA-based Messaging API framework in combination with an MQ Series Messaging system, the method comprising:

the CORBA-based application using C++ code to communicate at least one of a group of commands selected from poll request, receive reply, send reply, send request, and send request and block for reply to the CORBA-based Messaging API framework on the local system;

wherein the Messaging API framework encapsulates a set of application programming interfaces for interfacing with an MQ Series Messaging system, wherein the set of application programming interfaces comprises a poll request API, a receive reply API, a send reply API, a send request API, and a send request and block for reply API;

the Messaging API framework using MQ Series compliant language to communicate the selected command to a Local Queue Manager on the local system;

wherein the Local Queue Manager manages a set of queues, wherein the set of queues comprise a local request queue, a local reply queue, a local dead-letter queue, and a local transmission queue and wherein the Local Queue Manager uses the local transmission queue to provide a local address for communicating with a remote request queue and a remote reply queue;

the Local Queue Manager interpreting the selected command and modifying at least one of the set of queues managed by the Local Queue Manager in response to the selected command;

the Local Queue Manager communicating with a Remote Queue Manager on the remote system using the local transmission queue to update at least one of a group of queues selected from the local request queue, the local reply queue, the remote request queue and the remote reply queue;

wherein the Remote Queue Manager manages a set of queues, wherein the set of queues comprises the remote request queue, the remote reply queue, a remote dead-letter queue, and a remote transmission queue and wherein the Remote Queue Manager uses the remote transmission queue to provide a remote address for communicating with the local request queue and the local reply queue;

the Remote Queue Manager communicating information regarding the updated queue to the remote destination application on the remote system in response to at least one command originating from the remote destination application.

2. A method for sending a request from a CORBA-based application on a local system to a remote destination application on a remote system and receiving a reply using a CORBA-based Messaging API framework and using an MQ Series Messaging system, the method comprising:

the CORBA-based application using C++ code to communicate one of a group of commands selected from send requests and send request and block for reply to the CORBA-based Messaging API framework on the local system;

wherein the Messaging API framework encapsulates a set of application programming interfaces for interfacing with an MQ Series Messaging system, wherein the set of application programming interfaces comprises a poll request API, a receive reply API, a send reply API, a send request API, and a send request and block for reply API;

the Messaging API framework using MQ Series compliant language to communicate the selected command to a Local Queue Manager on the local system;

wherein the Local Queue Manager manages a set of queues, wherein the set of queues comprises a local request queue, a local reply queue, a local dead-letter queue, and a local transmission queue and wherein the Local Queue Manager uses the local transmission queue to provide a local address for communicating with a remote request queue and a remote reply queue;

the Local Queue Manager interpreting the selected command and modifying the local transmission queue managed by the Local Queue Manager in response to the selected command;

the Local Queue Manager communicating with a Remote Queue Manager on the remote system using the local transmission queue to update the remote request queue;

wherein the Remote Queue Manager manages a set of queues, wherein the set of queues comprises the remote request queue, the remote reply queue, a remote dead-letter queue, and a remote transmission queue and wherein the Remote Queue Manager uses the remote transmission queue to provide a remote address for communicating with the local request queue and the local reply queue;

the Remote Queue Manager communicating information regarding the updated remote request queue to the remote destination application on the remote system in response to a poll request command originating from the remote destination application;

the remote destination application responding to the request by sending a reply to the Remote Queue Manager using the send reply command;

the Remote Queue Manager interpreting the send reply command and modifying the remote transmission queue managed by the Remote Queue Manager in response to the send reply command;

the Remote Queue Manager communicating with the Local Queue Manager on the local system using the remote transmission queue to update the local reply queue;

the Local Queue Manager communicating information regarding the updated local reply queue to the Messaging API framework in response to a command originating from the CORBA-based application communicated to the Local Queue Manager through the Messaging API framework using MQ Series compliant language;

the Messaging API framework communicating the reply to the CORBA-based application in response to the command originating from the CORBA-based application where the command was communicated to the Messaging API framework using C++code.

3. The method of claim 2, wherein:

the action of the CORBA-based application using C++ code to communicate one of a group of commands selected from send request, and send request and block for reply to the CORBA-based Messaging API framework on the local system comprises communicating a send request and block for reply command; and wherein the information regarding the updates local reply queue is communicated to the Messaging API framework and the reply is communicated to the CORBA-based application in response to the original send request and block for reply command.

4. The method of claim 2, wherein the action of the CORBA-based application using C++ code to, communicate one of a group of commands selected from send request, and send request and block for reply to the CORBA-based Messaging API framework on the local system consists of communicating a send request command; further comprising the CORBA-based application using C++ code, to communicate the command receive reply to the Messaging API framework;

the Messaging API framework using MQ Series compliant language to communicate the command receive reply to the Local Queue Manager on the local system;

the CORBA-based application continuing to communicate the command receive reply until a response other than no message available, certificate of arrival, or certificate of delivery is received; and wherein the information regarding the updates local reply queue is communicated to the Messaging API framework and the reply is communicated to the CORBA-based application in response to the receive reply command.

* * * * *